US 7,287,125 B2

(12) United States Patent
Kaneko et al.

(10) Patent No.: US 7,287,125 B2
(45) Date of Patent: *Oct. 23, 2007

(54) DISK ARRAY DEVICE, METHOD FOR CONTROLLING THE DISK ARRAY DEVICE AND STORAGE SYSTEM

(75) Inventors: Seiji Kaneko, Zama (JP); Hiroki Kanai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/545,514

(22) Filed: Oct. 11, 2006

(65) Prior Publication Data

US 2007/0033342 A1 Feb. 8, 2007

Related U.S. Application Data

(63) Continuation of application No. 10/628,782, filed on Jul. 28, 2003, now Pat. No. 7,139,880.

(30) Foreign Application Priority Data

Oct. 17, 2002 (JP) .............................. 2002-303524

(51) Int. Cl.
*G06F 12/00* (2006.01)
(52) U.S. Cl. ...................... 711/141; 711/112; 711/113; 711/114; 707/201
(58) Field of Classification Search ................. 711/141
See application file for complete search history.

(56) References Cited

U.S. PATENT DOCUMENTS 5,761,531 A 6/1998 Ohmura et al.

| | | | |
|---|---|---|---|
| 5,875,462 A * | 2/1999 | Bauman et al. | 711/119 |
| 5,884,098 A | 3/1999 | Mason, Jr. | |
| 5,930,821 A * | 7/1999 | Gaskins et al. | 711/146 |
| 6,073,218 A | 6/2000 | DeKoning et al. | 711/150 |
| 6,173,377 B1 | 1/2001 | Yanai et al. | 711/162 |
| 6,275,897 B1 | 8/2001 | Bachmat | 711/114 |

(Continued)

FOREIGN PATENT DOCUMENTS

JP 4336340 11/1992

(Continued)

*Primary Examiner*—Brian R. Peugh
*Assistant Examiner*—Hashem Farrokh
(74) *Attorney, Agent, or Firm*—Mattingly, Stanger, Malur & Brundidge, P.C.

(57) ABSTRACT

A disk array device is equipped with a plurality of input/output channels that receive data input/output requests from an external device, a plurality of cache memories provided for the corresponding respective input/output channels, each of the cache memories connected to each of the corresponding respective input/output channels, a disk drive device, a disk control module that performs data input/output to and from the disk drive device, and a communication module that communicatively connects the input/output channels with the disk control module. The disk array device also includes a consistency maintaining module that can perform a consistency maintaining processing to maintain consistency of data stored in each of the cache memories. According to the content of the data input/output request received from the external device, an execution order of a response processing to respond to the external device according to the data input/output request and the consistency maintaining processing is controlled.

10 Claims, 7 Drawing Sheets

U.S. PATENT DOCUMENTS

| | | | |
|---|---|---|---|
| 6,311,252 B1 | 10/2001 | Raz | |
| 6,321,298 B1 | 11/2001 | Hubis | 711/124 |
| 6,347,358 B1 | 2/2002 | Kuwata | |
| 6,615,314 B1 | 9/2003 | Higaki et al. | |
| 6,675,264 B2 * | 1/2004 | Chen et al. | 711/141 |
| 6,792,507 B2 | 9/2004 | Chiou et al. | 711/119 |
| 6,912,669 B2 | 6/2005 | Hauck et al. | 714/6 |
| 2002/0188786 A1 | 12/2002 | Barrow et al. | |
| 2003/0120862 A1 | 6/2003 | Hirano et al. | |
| 2003/0135782 A1 | 7/2003 | Matsunami et al. | |
| 2003/0158980 A1 | 8/2003 | Mizuno | |
| 2003/0159001 A1 | 8/2003 | Chaimer et al. | 711/120 |
| 2003/0191890 A1 | 10/2003 | Okamoto et al. | |
| 2003/0212860 A1 | 11/2003 | Jiang et al. | |
| 2003/0221062 A1 | 11/2003 | Shimada | |
| 2004/0024951 A1 | 2/2004 | Aruga | |
| 2004/0078517 A1 | 4/2004 | Kaneko et al. | 711/113 |
| 2004/0078518 A1 | 4/2004 | Kuwata | |
| 2004/0098543 A1 | 5/2004 | Araki et al. | |

FOREIGN PATENT DOCUMENTS

| | | |
|---|---|---|
| JP | 09198308 | 7/1997 |
| JP | 10063576 | 3/1998 |
| JP | 2001290790 | 10/2001 |
| JP | 2001306265 | 11/2001 |

* cited by examiner

Fig. 4
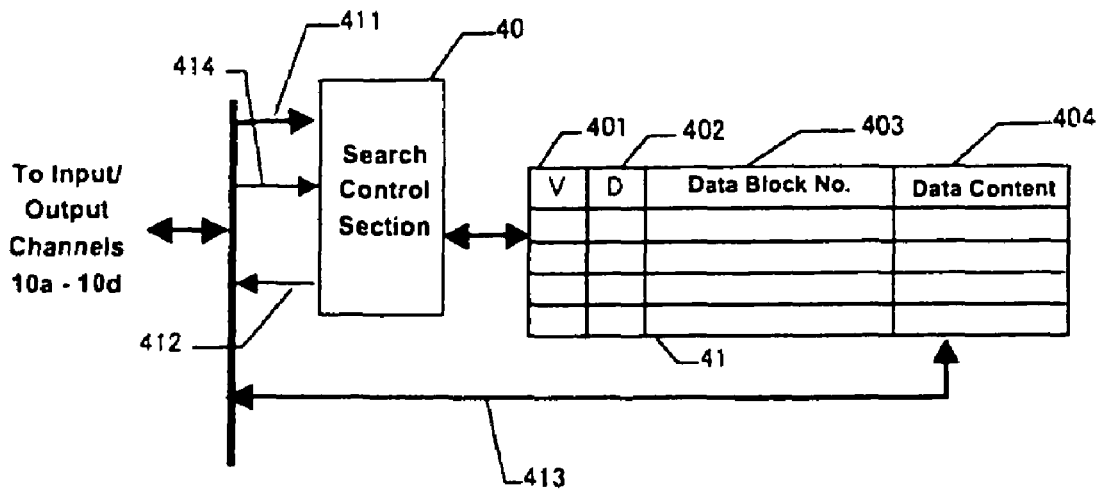
Fig. 5
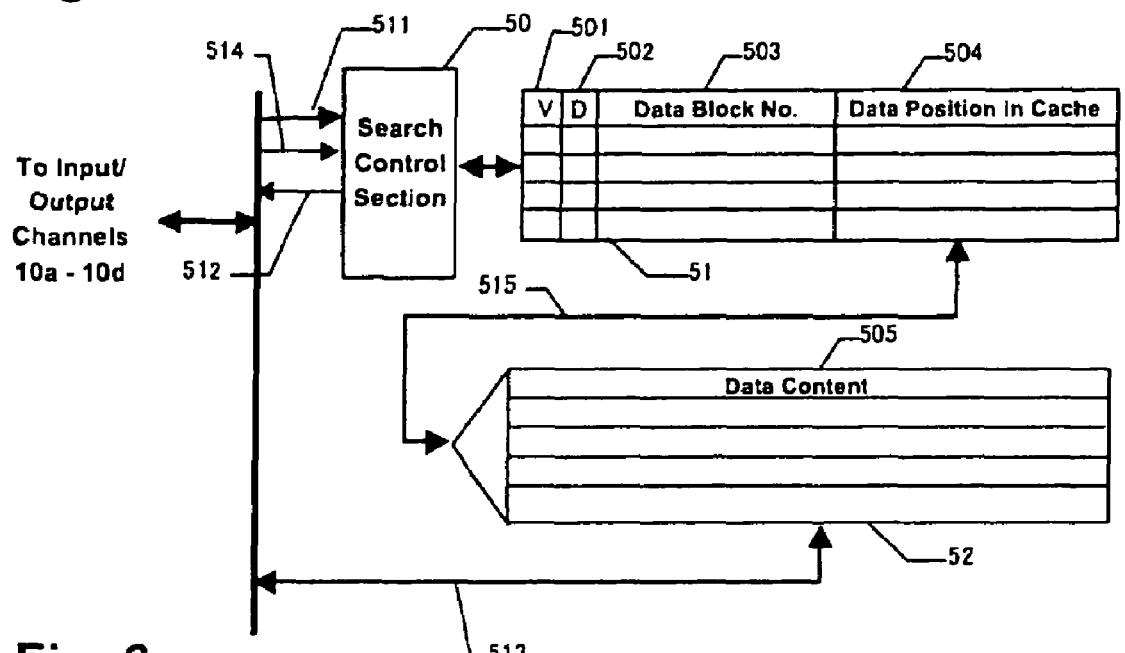
Fig. 6
| Data Block No. | Disk Adapter No. |
|---|---|
|  |  |
|  |  |
|  |  |

Fig. 7

| Data Block No. | Disk Drive No. | Data Position in Drive | Send Destination I/O Channel No. |
|---|---|---|---|
| | | | |
| | | | |
| | | | |

Fig. 8

| Invalidation Command Code | Data Block No. |
|---|---|

Fig. 9

| Update Command | Data Block No. | Update Data |
|---|---|---|

Fig. 10

| Header | Port ID | LUN | Address | Data Length | Mode |
|---|---|---|---|---|---|

DISK ARRAY DEVICE, METHOD FOR CONTROLLING THE DISK ARRAY DEVICE AND STORAGE SYSTEM

The present application is a continuation of application Ser. No. 10/628,782, filed Jul. 28, 2003 now U.S. Pat. No. 7,139,880, the contents of which are incorporated herein by reference.

BACKGROUND OF THE INVENTION

The present invention relates to a disk array device, a control method for the disk array device, and a storage system.

A common disk array device has a structure in which a disk adapter that controls input/output of data to disk drives, an input/output channel that controls connection with a host computer, and a cache memory are connected to one another via a network switch provided inside the disk array device.

As a result, the input/output channel, the disk adapter and the cache memory compete for traffic within the network switch of the disk array device, which increases the usage rate of the network switch, which in turn reduces the response speed to the host computer.

The present invention was conceived in view of the situation, and relates to a disk array device, a control method for the disk array device, and a storage system.

A disk array device in accordance with an embodiment of the present invention includes: a plurality of input/output channels that receive data input/output requests from external devices; a plurality of cache memories, each of which is provided for each of the input/output channels and connected to each of the corresponding input/output channels; disk drives; a disk control module that performs data input/output to and from the disk drives; and a communication module that communicatively connects the input/output channels with the disk control module.

Other features of the present invention shall become apparent from the description of the present specification and attached drawings.

BRIEF DESCRIPTION OF THE DRAWINGS

FIG. 4 is a diagram of the configuration of a cache memory in accordance with an embodiment example of the present invention.

FIG. 5 is diagram of the configuration of a cache memory in accordance with an embodiment example of the present invention.

FIG. 6 is a diagram of a data table format in accordance with an embodiment example of the present invention.

FIG. 7 is a diagram of a data table format in accordance with an embodiment example of the present invention.

FIG. 8 is a diagram of a command format of an invalidation command in accordance with an embodiment example of the present invention.

FIG. 9 is a diagram of a command format of an update command in accordance with an embodiment example of the present invention.

FIG. 10 is a diagram of the data format of a data input/output request in accordance with an embodiment example of the present invention.

DESCRIPTION OF PREFERRED EMBODIMENTS

Overview of Storage System

Figure 1:
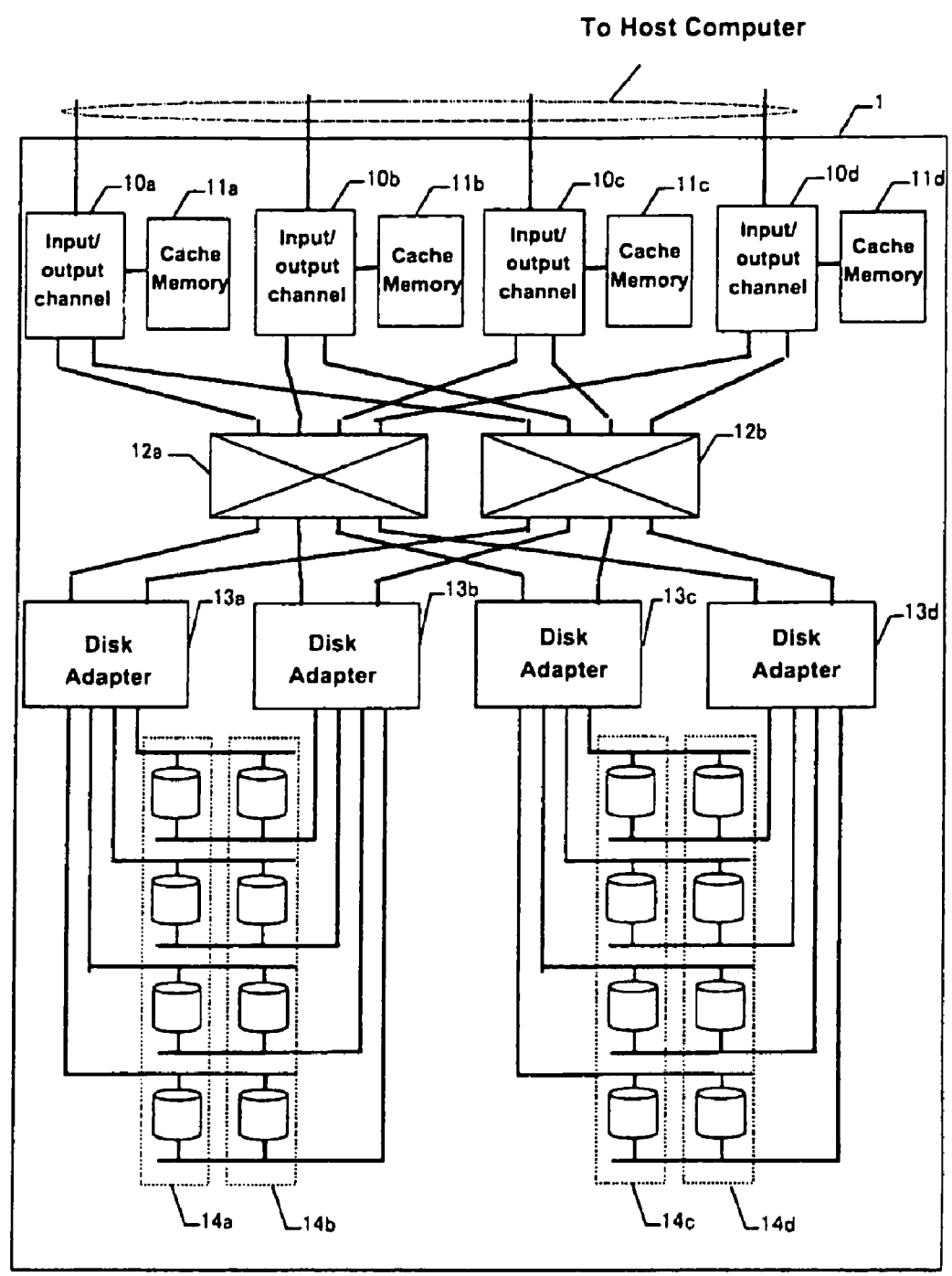
FIG. 1 schematically shows the configuration of a storage system in accordance with an embodiment example of the present invention.

FIG. 1 shows an overview of a storage system including a disk array device 1 configured in accordance with an embodiment of the present invention. The storage system shown in FIG. 1 is provided with a plurality of input/output channels 10$a$-10$d$ and a plurality of cache memories 11$a$-11$d$, wherein each of the cache memories 10$a$-10$d$ is provided for each of the corresponding input/output channels 11$a$-11$d$. According to this configuration, if data that is the subject of a data input/output request from a host computer is in one of the cache memories 11$a$-11$d$ provided to correspond to one of the input/output channels 10$a$-10$d$ that received the data input/output request, the data can be sent to the host computer. Consequently, when data is in one of the cache memories 11$a$-11$d$, a response can be sent back quickly to the host computer.

According to the configuration in FIG. 1, if, for example, data input/output requests received by different input/output channels among the input/output channels 10$a$-10$d$ result in accesses to the same data stored in a storage region of a disk drive, the data that is stored in the storage region of the disk drive would simultaneously be stored in a plurality of cache memories 11$a$-11$d$.

In this state, if an update were to take place, for example, on the data as a result of a new data input/output request received by one of the input/output channels 10$a$-10$d$, a processing to maintain consistency of data stored in each of the cache memories 11$a$-11$d$, such as a processing to invalidate the data stored in one or more of the other cache memories 11$a$-11$d$ or a processing to rewrite the data stored in one or more of the other cache memories 11$a$-11$d$, must be performed.

However, in the processing to maintain consistency, communications for invalidating and communications to notify updated data to the cache memories 11$a$-11$d$ cause an increase in the network switch traffic, which reduces the response speed to the host computer; this would dilute the effect that can be obtained by providing the cache memories 11$a$-11$d$ for the corresponding input/output channels 10$a$-10$d$.

The processing to maintain consistency, however, is not necessarily required to be immediate or strictly maintained in all cases. For example, such processing would not be required when access to data stored in a certain storage region can be made only through a specific channel among the input/output channels 10a-10d.

Further, when accesses from a plurality of input/output channels 10a-10d are anticipated for the same data stored in one storage region, consistency may not necessarily have to be maintained due to the specification or nature of software operating on the host computer, or even if it does, strict consistency may not be required.

In view of the above, in one embodiment of the present invention, a disk array device may include a plurality of input/output channels that receive data input/output requests from external devices; a plurality of cache memories, each of which is provided for each of the input/output channels and connected to each of the corresponding input/output channels; disk drives; a disk control module that perform data input/output to and from the disk drives; a communication module that communicatively connect the input/output channels with the disk control module; and a module to execute a consistency maintaining processing to maintain consistency of data stored in each of the cache memories. The disk array device further includes a module that controls, when a data input/output request is received, according to the contents of the data input/output request, the execution order of a response processing to a host computer for the data input/output request and the consistency maintaining processing.

When updating data stored in any of the cache memories, the consistency maintaining processing may take place. The consistency maintaining processing includes, for example, a processing to invalidate the same pre-updated data stored in other ones of the cache memories that is stored in the same storage region as the storage region of the disk drive where the data to be updated is stored; or a processing to update the data in the cache memory, as well as the same pre-updated data stored in another cache memory that is stored in the same storage region as the storage region of the disk drive where the data to be updated is stored.

As described above, a processing to maintain consistency is not necessarily required due to the specification or nature of software operating on the host computer, or even if it does, strict consistency may not be required. By controlling the execution order of a response processing to the host computer for an input/output request and a consistency maintaining processing according to the contents of the data input/output request sent from the host computer, and by controlling the order of execution depending on whether consistency must be maintained or not, the disk array device can be used efficiently. Specifically, when a processing to maintain consistency is not necessarily required, a response to the host computer can be made quickly by executing an consistency maintaining processing after performing a response processing to the host computer.

Furthermore, when there is a plurality of logical volumes, which are logical storage regions, in storage regions of disk drives and when an identifier of a logical volume that is the subject of processing for a data input/output request is set in the data input/output request, controlling the execution order can be performed according to the logical volume identifier set in the data input/output request.

By being able to control the execution order based on the logical volume identifier, more variations in setting methods become available; for example, when individual logical volumes are allocated for each application operating on a host computer, the control of the execution order can be set easily based on the nature of the application programs.

In another embodiment of the present invention, when a disk array device is connected to another disk array device, and the former disk array device receives a data write request as a data input/output request from an external device, the disk array device writes the data designated in the request to its own disk drives and at the same time sends the write request to the other disk array device; when an input/output channel of the former disk array device receives the data write request, the input/output channel operates in either an operation mode to write data to the disk array device's own disk drives (i.e., a normal mode) or an operation mode to send the write request to the other disk array (i.e., a copy mode); the execution order is controlled depending on which operation mode the input/output channel that received the data input/output request from the external device is operating.

In this instance, if a processing for a data input/output request received by an input/output channel operating in the copy mode has less need for consistency maintenance compared to a processing for a data input/output request received by an input/output channel operating in the normal mode, for example, a response to a host computer can be made quickly by executing an consistency maintaining processing after performing a response processing to the host computer in the copy mode.

System Configuration

The configuration of the storage system in FIG. 1 is described below in greater detail. The disk array device 1 is connected to host computers, which are external devices, via a communication means such as SAN (Storage Area Network) or LAN (Local Area Network). The disk array device 1 comprises the four input/output channels 10a-10d that communicate with the host computers, the cache memories 11a-11d provided for and connected to the corresponding input/output channels 10a-10d, disk drives 14a-14d, four disk adapters 13a-13d that are connected to the respective disk drives 14a-14d and control input/output of data to and from the respective disk drives 14a-14d; and two network switches 12a and 12b that connect the input/output channels 10a-10d with the disk adapters 13a-13d.

In FIG. 1, the network switches 12a and 12b are provided in plurality, such that there is redundancy in the route between the input/output channels 10a-10d and the disk adapters 13a-13d. However, only one network switch may be provided instead of two. The four input/output channels 10a-10d receive data input/output requests such as data requests and data write requests from the host computer. Based on the data input/output request received by the input/output channel 10a-10d, the disk array device 1 reads or writes data to or from the disk drives 14a-4d and sends, as necessary, the results or data read to the appropriate host computer.

Input/Output Channels

Figure 2:
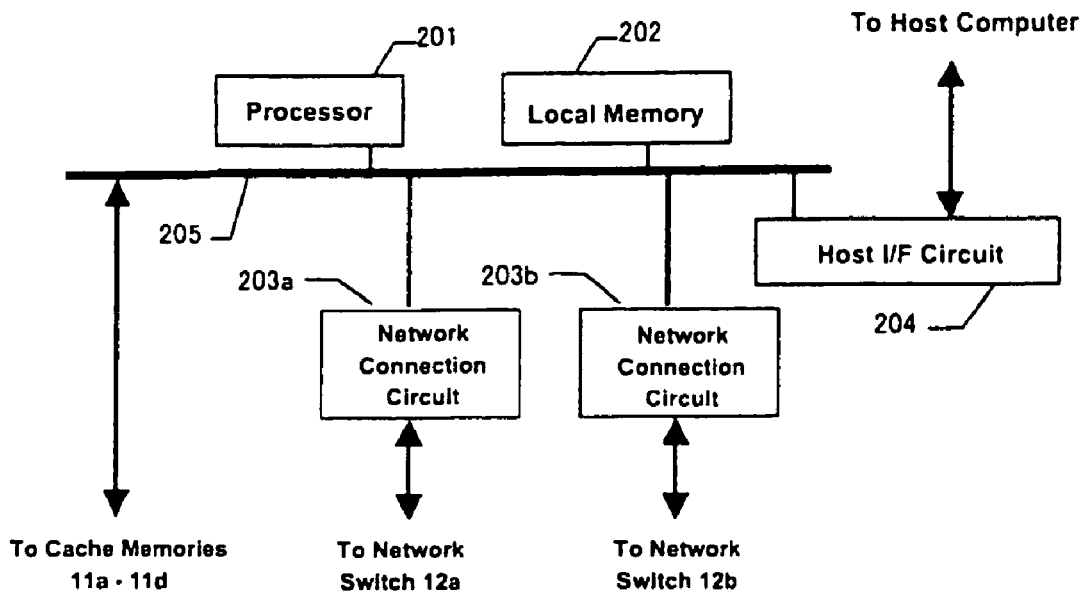
FIG. 2 is a diagram of the configuration of an input/output channel in accordance with an embodiment example of the present invention.

FIG. 2 is an example of the configuration of the input/output channels 10a-10d. Each of the input/output channels 10a-10d has a processor 201. Each of the input/output channels 10a-10d also has a local memory 202 that stores control programs executed by the processor 201 and information (data) required for processing. In addition, each of the input/output channels 10a-10d has a host I/F circuit 204 for connecting with the host computer, as well as network connection circuits 203a and 203b for connecting with the network switches 12a and 12b.

All of these elements are connected to each other by a processor bus 205, which is a high-speed signal line bus. The corresponding cache memory among the cache memories 11a-11d is also connected to the processor bus 205. Through this configuration, the processor 201 is able to read and write at high-speed to and from the corresponding cache memory among the cache memories 11a-11d.

In FIG. 2, the processing in the input/output channels 10a-10d is assumed to be performed by having the corresponding processor 201 execute the control programs stored in the corresponding local memory 202. However, a part or all of the functions of the control program can alternatively be implemented by hardware.

Disk Adapters

Figure 3:
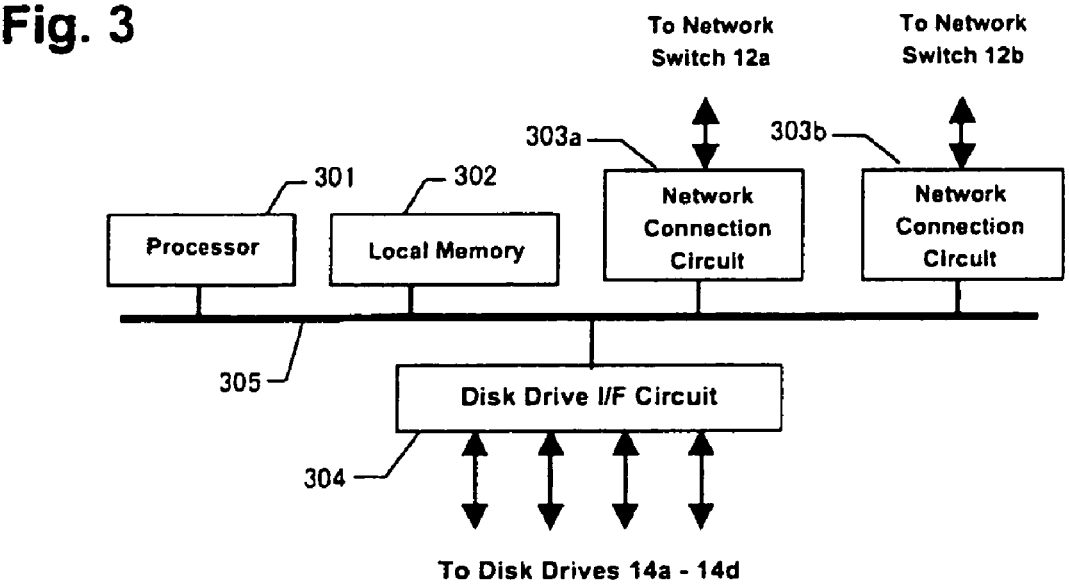
FIG. 3 is a diagram of the configuration of a disk adapter in accordance with an embodiment example of the present invention.

FIG. 3 is an example of the configuration of the disk adapters 13a-13d. Each of the disk adapters 13a-13d has a processor 301. Each of the disk adapters 13a-13d also has a local memory 302 that stores control programs executed by the processor 301 and information (data) required for processing.

In addition, each of the disk adapters 13a-13d has a disk drive IFEATURES circuit 304 for directly connecting with the corresponding disk drives among the disk drives 14a-14d, as well as network connection circuits 303a and 303b for connecting with the network switches 12a and 12b. All of these elements are connected to the processor 301 via a processor bus 305, which is a high-speed signal line bus.

In FIG. 3, the processing in the disk adapters 13a-13d is assumed to be performed by having the corresponding processor 301 execute the control programs stored in the corresponding local memory 302; however, as with the input/output channels 10a-10d, a part or all of the functions of the control program can alternatively implemented by hardware.

Cache Memories

FIG. 4 is an example of the configuration of the cache memories 11a-11d. Each of the cache memories 11a-11d has a search control section 40 and a memory section 41, where each data is stored in the memory section 41 as a set of a significant bit V 401, a rewriting bit D 402, a data block number 403 and a data content 404.

Each of the input/output channels 10a-10d can notify via an address bus 411 the data block number 403 requested by a host computer and causes the search control section 40 to search whether there is data whose data block number 403 matches and whose significant bit V 401 is in a valid state (for example, "1") in the memory section 41.

If the data is found as a result of searching, a hit signal is sent via a response signal bus 412, and the fact that the matching data has been found is reported. In addition, the corresponding data content 404 is read via a data path 413. When writing data, a write command signal is notified via a control command bus 414, data transferred by the data path 413 is written to the corresponding data content 404, and the rewriting bit D 402 goes into a set state (for example, "1") to record that a rewrite has occurred. If no matching data is found as a result of searching, a miss signal is sent via the response signal bus 412, and the fact that no matching data has been found is reported.

For example, if an invalidation signal for invalidating data in one of the cache memories 11a-11d is sent from one of the disk adapters 13a-13d, the appropriate one of the input/output channels 10a-10d similarly notifies the corresponding data block number 403 via the address bus 411 and causes the search control section 40 to search whether there is data whose data block number 403 matches and whose significant bit V 401 is in a valid state (for example, "1") in the memory section 41.

If the data is found as a result of searching, the content of the corresponding rewriting bit D 402 is also checked. If the rewriting bit D 402 is in a set state, a dirty hit signal is sent via the response signal bus 412.

The appropriate one of the input/output channels 10a-10d that received the dirty hit signal reads the corresponding data content 404 through the data path 413 and sends the data content 404 to the disk adapter among the disk adapters 13a-13d that sent the invalidation signal. If the rewriting bit D 402 is not in a set state, a clean hit signal is sent via the response signal bus 412.

In both of these cases, the appropriate one among the input/output channels 10a-10d subsequently notifies the corresponding data block number 403 via the address bus 411 and an invalidation command signal via the control command bus 414, which sets the significant bit V 401 in an invalid state (for example, "0") and invalidates the data set.

If the data is not found as a result of searching, a miss signal is sent via the response signal bus 412, and the fact that the data was not found is reported to the appropriate input/output channel among the input/output channels 10a-10d. In all of these cases, the appropriate input/output channel among the input/output channels 10a-10d at the end sends back an invalidation processing completion signal to the disk adapter among the disk adapters 13a-13d that sent the invalidation signal, in order to communicate that the processing concerning invalidation has been completed.

If the rewriting bit D 402 is in a set state and if it is recorded that the data read from one of the disk drives 14a-14d has been rewritten, the rewritten data is sent to the disk adapters 13a-13d after an appropriate amount of time has passed or when the cache memories 11a-11d become full, in addition to when an invalidation takes place; after data is written back to the appropriate disk drive among the disk drives 14a-14d, the rewriting bit D 402 is set to a reset state (for example, "0"), and the record that a rewriting has occurred is erased.

Although the search control section 40 actually performs a search control of the memory section 41 according to FIG. 4, only the memory section 41 may be provided without the search control section 40, and the processors 201 of the input/output channels 10a-10d can perform an equivalent function.

In addition, although there are various signal buses such as the address bus 411, the response signal bus 412, the data path 413, and the control command bus 414, and these are connected in a combined form to the input/output channels 10a-10d according to FIG. 4, a single signal bus can be provided through which signal commands equivalent to the various signal buses, such as the address bus 411, the response signal bus 412, the data path 413 and the control command bus 414, are transferred on the single signal bus.

According to the example in FIG. 4, data sets each comprising the significant bit V 401, the rewriting bit D 402, the data block number 403 and the data content 404 are all stored in the single memory section 41, such that when searching to determine whether matching data exists, the entire memory section 41 must be searched. As a result, it is conceivable for searching to become time-consuming as the capacity of the memory section 41 grows larger.

In such a case, the configuration as shown in FIG. 5 may be used. In FIG. 5, each of the cache memories 11a-11d comprises a control search section 50, a tag section 51 and a data section 52; in the tag section 51 are stored a significant bit V 501, a rewriting bit D 502, a data block number 503 and a data position in cache 504. In the data section 52 is stored a data content 505.

In the tag section 51, contents equivalent to the corresponding contents in FIG. 4 are recorded in the significant bit V 501, the rewriting bit D 502 and the data block number 503. The position of data indicated in the data section 52 is recorded in the data position in cache 504.

To take out a data content from the data section 52, the position of the data is sent to the data section 52 via a data position signal 515 from the data position in cache 504 that corresponds to the data block number 503, and the data content is read by a data path 513.

When writing data, data communicated via the data path 513 is written in the position designated similarly by the data position signal 515. Signals sent by an address bus 511, a control command bus 513 or a response signal bus 512 are equivalent to the corresponding signals in FIG. 4.

By employing such a configuration, only the tag section 51 has to be searched when searching to determine whether certain data exists, according to the example in FIG. 5; consequently, even if the capacity of the data section 52 grows larger, the search time would not be very affected.

In other words, due to the fact that data contents are stored in the memory section 41 in the, example in FIG. 4, numerous semiconductor chips become necessary as the number of data blocks grows, which requires numerous semiconductor chips to be searched, which in turn requires longer time for search.

In contrast, in the example in FIG. 5, semiconductor chips storing the data section 52 that stores data contents and semiconductor chips storing the tag section 51 are separate; consequently, the number of semiconductor chips to store the tag section 51 can be few, which requires only few semiconductor chips to be searched, which in turn requires shorter time for search.

Although the search control section 50 actually performs a search control of the tag section 51 according to FIG. 5, only the tag section 51 and the data section 52 may be provided without the search control section 50, and the processors 201 of the input/output channels 10a-10d can perform an equivalent function, as in the example in FIG. 4.

In addition, although there are various signal buses such as the address bus 511, the response signal bus 512, the data path 513, and the control command bus 514, and these are connected in a combined form to the input/output channels 10a-10d according to FIG. 5, again as in the example in FIG. 4, a single signal bus can be provided through which signal commands equivalent to the various signal buses, such as the address bus 511, the response signal bus 512, the data path 513 and the control command bus 514, are transferred on the single signal bus.

Data Table

When data corresponding to a data block number requested from the host computer is not found in the cache memories 11a-11d connected to one of the input/output channels 10a-10d that received the request, a data table, one of whose format examples is shown in FIG. 6, provided in each of the input/output channels 10a-10d records to which of the disk adapters 13a-13d data should be requested.

A data block number and a disk adapter number are recorded as a set in the data table in FIG. 6, where there are sets only in numbers corresponding to data block numbers predetermined between each of the input/output channels 10a-10d and a host computer connected to each.

When storing a certain number (for example, 16) of consecutive data block numbers in one of the disk drives 14a-14d connected to a single disk adapter among the disk adapters 13a-13d, a set designated by a disk drive number and a disk adapter number of the first block number can be made to encompass all of the data blocks (for example, 16). By doing this, the size of the data table can be reduced to one-sixteenth, for example.

Such a data table is stored in the local memory 202 in FIG. 2, for example, and read or written as necessary by the processor 201.

FIG. 7 is an example of the format of a data table that is stored in the disk adapters 13a-13d, which records in which position of which disk drive among the disk drives 14a-14d data corresponding to a data block number requested from the input/output channels 10a-10d is stored.

A data block number, a disk drive number, a data position within a drive, and a send destination input/output channel number, which indicates the input/output channel to which data is sent, are recorded as a set in the data table shown in FIG. 7. If data corresponding to a certain data block number has never been sent to any of the input/output channels 10a-10d, an invalid input/output channel number that is predetermined is recorded as the corresponding send destination input/output channel number. Further, when the cache memory among the cache memories 11a-11d corresponding to the input/output channel among the input/output channels 10a-10d to which data was sent becomes full, causing the data to be turned away and deleted, an invalid input/output channel number can be set as the corresponding send destination input/output channel number.

In each of the disk adapters 13a-13d, there are entries provided in the data table only in numbers corresponding to the data block numbers stored in one of the disk drives 14a-14d connected to each of the corresponding disk adapters 13a-13d. The data table in reality is stored in the local memory 302 in FIG. 3, for example, and read or written as necessary by the processor 301.

Command Format

The following is a description of command formats for an invalidation command and an update command that are used in consistency maintaining processing for data stored in the cache memories 11a-11d.

When data sent to one of the input/output channels 10-10d is requested from another of the input/output channels 10a-10d, a command format for an invalidation command, one of whose examples is shown in FIG. 8, in the disk adapters 13a-13d is sent to the input/output channel to which the data was first sent to invalidate the data in the corresponding cache memory among the cache memories 11a-11d. The invalidation command comprises an invalidation command code and a data block number to be invalidated.

When rewriting of certain data in one of the input/output channels 10a-10d occurs among a plurality of input/output channels 10a-10d having the same data, a command format for an update command, one of whose examples is shown in FIG. 9, is sent from the appropriate disk adapter among disk adapters 13a-13d to the appropriate input/output channel among the input/output channels 10a-10d in order to write back the data to the appropriate disk drive among the disk drives 14a-14d through the corresponding disk adapter among the disk adapters 13a-13d, and at the same time to rewrite and update the same pre-updated data in the cache memories 11a-11d corresponding to the other input/output channels 10a-10d, where the update command is sent instead of the invalidation command in FIG. 8. The command format comprises, in addition to a command code indicating an update command and a data block number, update data for updating data content.

Description of Processing

The following is a detailed description of a processing that takes place in the disk array device 1 when a data input/output request, such as a data request or data write request, sent from a host computer is received.

FIG. 10 is one example of a data format of data input/output requests sent from a host computer to the disk array device 1. A header indicates ID of the host computer. A port ID indicates the port ID of the port to which a logical volume, which is the subject of processing for the data input/output request, is connected. Logical volumes refer to logical storage regions partitioned and established in storage regions of the disk drives 14a-14d. An LUN (Logical Unit Number) column indicates the identifier of the logical volume that is the subject of the data input/output request. An address column and a data length column are established when the data input/output request is a data request, for example; in such a case, the address column indicates the beginning address of the logical volume that stores the read destination data, while the data length column indicates the length of data that is the subject of reading.

A mode column indicates a value referred to in the disk array device 1 to control the execution order of a response processing to the host computer for the data input/output request and an consistency maintaining processing for data in each of the cache memories 11a-11d. In this embodiment example, either "0" or "1" is set in the mode column.

A value "0" is set, for example, when high response speed to the host computer is required rather than maintaining consistency of data stored in each of the cache memories 11a-11d in a data input/output request processing. On the other hand, a value "1" is set, for example, when consistency of data stored in each of the cache memories 11a-11d must be maintained in a data input/output request processing.

Data Request

First, a processing that is performed in the disk array device 1 when a data request is received as a data input/output request sent from a host computer is described below with reference to a flowchart in FIG. 11. In this example, it is the input/output channel 10a that receives the data request, but the processing is similarly applicable when other input/output channels 10b-10d receive the data request.

Upon receiving a data request from a host computer (step 1110), the input/output channel 10a checks whether data that is the subject of reading exists in the cache memory 11a (step 1112). If it does exist (step 1112: YES), the input/output channel 10a reads the data from the cache memory 11a and sends it to the host computer (step 1113).

On the other hand, if the data requested does not exist in the cache memory 11a (step 1112: NO), the input/output channel 10a determines based on a data block number designated in the data request which among the disk adapters 13a-13d is connected to one of the disk drives 14a-14d with the data, and sends the data request to the appropriate disk adapter among the disk adapters 13a-13d using one of the network switches 12a and 12b. Here, one of the disk drives that is connected to the disk adapter 13a is assumed to have the data. Upon receiving the data request, the disk adapter 13a determines which among the disk drives 14a and 14b has the data based on the data block number (step 1114), and begins to read the data from the disk drive (step 1115).

At this point, the disk adapter 13a checks the content of a mode column of the data request (step 1116); if "0" is set in the mode column (step 1116: YES), after sending the data read from the disk drive to the input/output channel 10a (step 1117), the processing proceeds to step 1118 and subsequent steps.

On the other hand, if "1" is set in the mode column (1116: NO), the processing proceeds directly to step 1118 and subsequent steps.

In step 1118, the disk adapter 13a searches to determine whether the data requested has previously been sent to any of the input/output channels 10b-10d other than the input/output channel 10a. Specifically, this search takes place by searching whether a valid input/output channel number is registered under the send destination input/output channel number of the data table in FIG. 7 for the disk adapter 13a.

If the data requested has never been sent from the disk adapter 13a to the cache memories 11b-11d corresponding to the other input/output channels 10b-10d (step 1119: NO), the processing proceeds to step 1125. On the other hand, if the data requested has been sent previously from the disk adapter 13a to the cache memories 11b-11d corresponding to the other input/output channels 10b-10d (step 1119: YES), an invalidation command shown in FIG. 8 is sent to the input/output channel to which the data requested has been sent before (step 1120), and the data is deleted from the cache memory corresponding to the input/output channel.

In addition, whether there has been any rewrite to the data in the cache memory corresponding to the input/output channel and whether the rewritten data has not been written back to the appropriate disk drive are determined (step 1121). Specifically, these determinations are made by examining the rewriting bit D 402 or 502 in FIG. 4 or 5, respectively. If the rewritten data has not been written back to the appropriate disk drive, the corresponding input/output channel reads from the cache memory the data that has not been written back and sends the data back to the appropriate disk adapter. The disk adapter, after the reading of data from the disk drive that began in step 1115 is completed, writes the rewritten data sent from the input/output channel over the data read from the disk drive (step 1122).

Next, the disk adapter waits for an invalidation processing completion signal to be sent from the input/output channel to confirm that the data has been invalidated (step 1123).

Next, by setting a predetermined invalid channel number in the send destination input/output channel number of the data table in FIG. 7, the record of the data send destination is deleted (step 1124). However, since a new input/output channel number of the input/output channel to which data is sent will be recorded later (in step 1125), the processing in step 1124 may be omitted.

Next, the cache memory 11a corresponding to the input/output channel 10a that received the data request in step 1110 is determined as the destination for sending the data, and the input/output channel is recorded accordingly (step 1125). Specifically, such a recording is done by recording a valid channel number under the send destination input/output channel number of the data table in FIG. 7.

If reading from the disk drive that began in step 1115 has not yet completed, the disk adapter 13a waits until the reading is completed; once the reading is completed, the data read is sent to the input/output channel 10a and stored in the cache memory 11a connected to the input/output channel 10a (step 1126).

Next, the disk adapter 13a checks the content of the mode column of the data request (step 1127); if "1" is set in the mode column (step 1127: YES), the disk adapter 13a sends the data read from the disk drive to the input/output channel 10a (step 1128) and proceeds to step 1129 and subsequent steps. On the other hand, if "0" is set in the mode column (step 1127: NO), the processing proceeds to step 1129 and subsequent steps.

In step 1129, whether the data that has passed through step 1129 and was read from the disk drive has been overwritten is determined. If it has been overwritten, the overwritten data is written back to the appropriate disk drive (step 1130).

If "1" is set in the mode column in the processing above, i.e., an invalidation processing is to be performed before responding to the host computer, the processing speed can be enhanced by completing the processing to read data from the disk drive (step 1115) by the time of completion of processing in step 1122 and step 1126, in other words, by overlapping these processings.

As described above, in this embodiment example, if "0" is set in the mode column in step 1116, the processing that begins in step 1118 is executed after the data read from a disk drive is first sent to the host computer. In other words, if "0" is set in the mode column of the data input/output request, the processing in steps 1118 through 1130 that is required to maintain consistency of data stored in each of the cache memories 11a-11d takes place after the response processing to the host computer from the disk array device 1 takes place, which enhances the response speed to the host computer.

As a result, if consistency does not have to be maintained due to the specification or nature of software operating on the host computer, or even if it does, it does not have to be strictly maintained, the response speed to the host computer can be enhanced for such a data input/output request by setting "0" in the mode column of the data input/output request from such software.

The processing for invalidation such as in step 1120 may be a factor that reduces the response speed in responding to the host computer, since communications for requesting invalidation or for checking that invalidation has taken place are done by a switch. However, by having the invalidation process takes place after-the-fact, i.e., after the response processing to the host computer, the response speed to the host computer can be improved.

Figure 11:
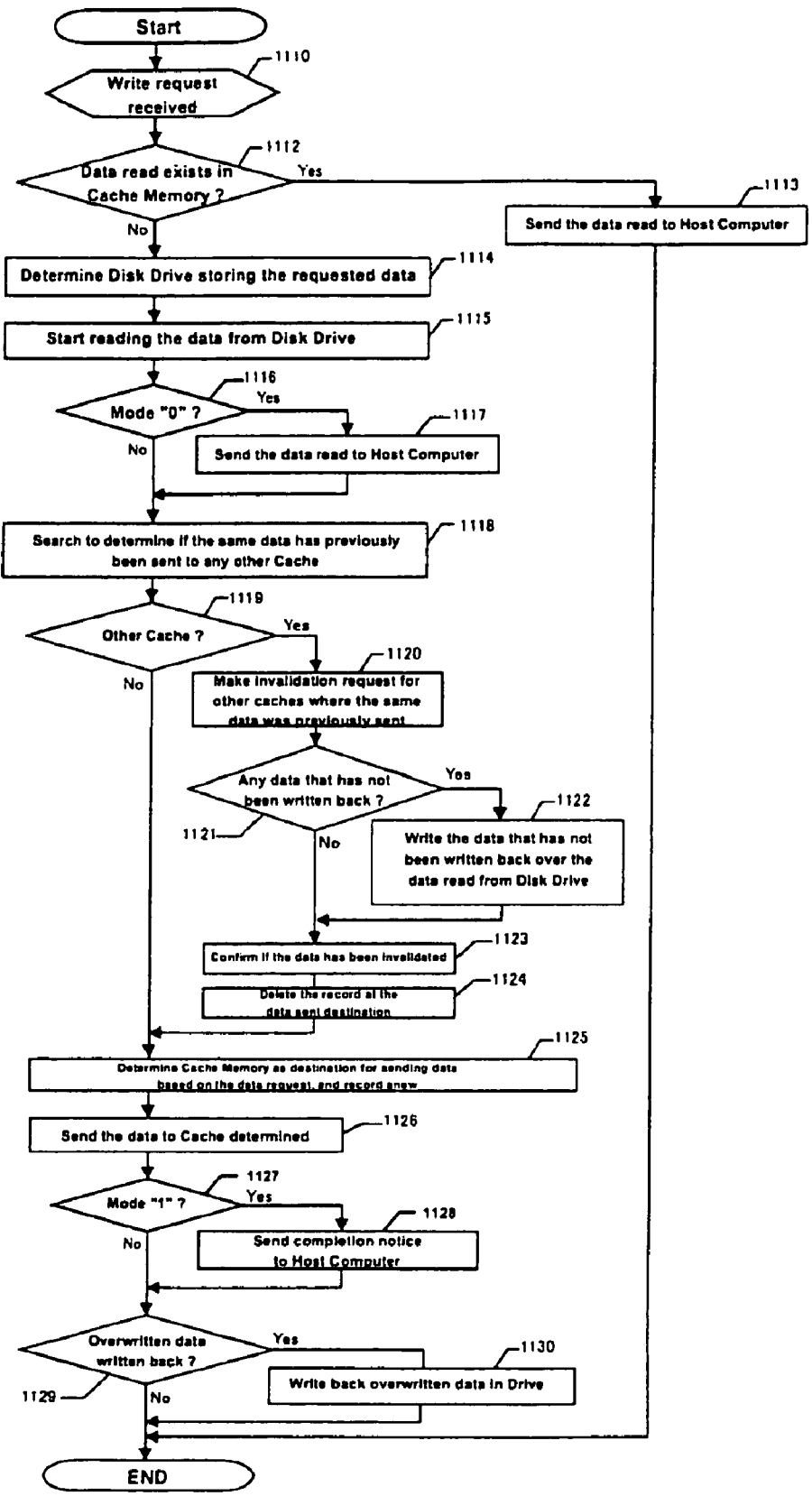
FIG. 11 is a flowchart illustrating a processing that takes place in a disk array device when a data request is received in accordance with an embodiment example of the present invention.

In FIG. 11, a processing to determine that "0" is set as the mode and a send processing to the host computer (steps 1116 and 1117) take place before step 1118; however, these processing can alternatively take place between step 1118 and step 1119 or between step 1119 and step 1120, for example. In other words, as long as the structure allows the response to the host computer to take place before those consistency maintaining processing that are the main factors for reducing the response speed to the host computer among processing required to maintain consistency of data stored in each of the cache memories 11a-11d, an enhancement in the response speed to the host computer can be expected.

[Data Write Request]

The following is a processing that is performed in the disk array device 1 when a data write request is received as a data input/output request sent from a host computer. In this example, it is the input/output channel 10a that receives the data write request, but the processing is similarly applicable when other input/output channels 10b 10d receive the data write request.

Figure 12:
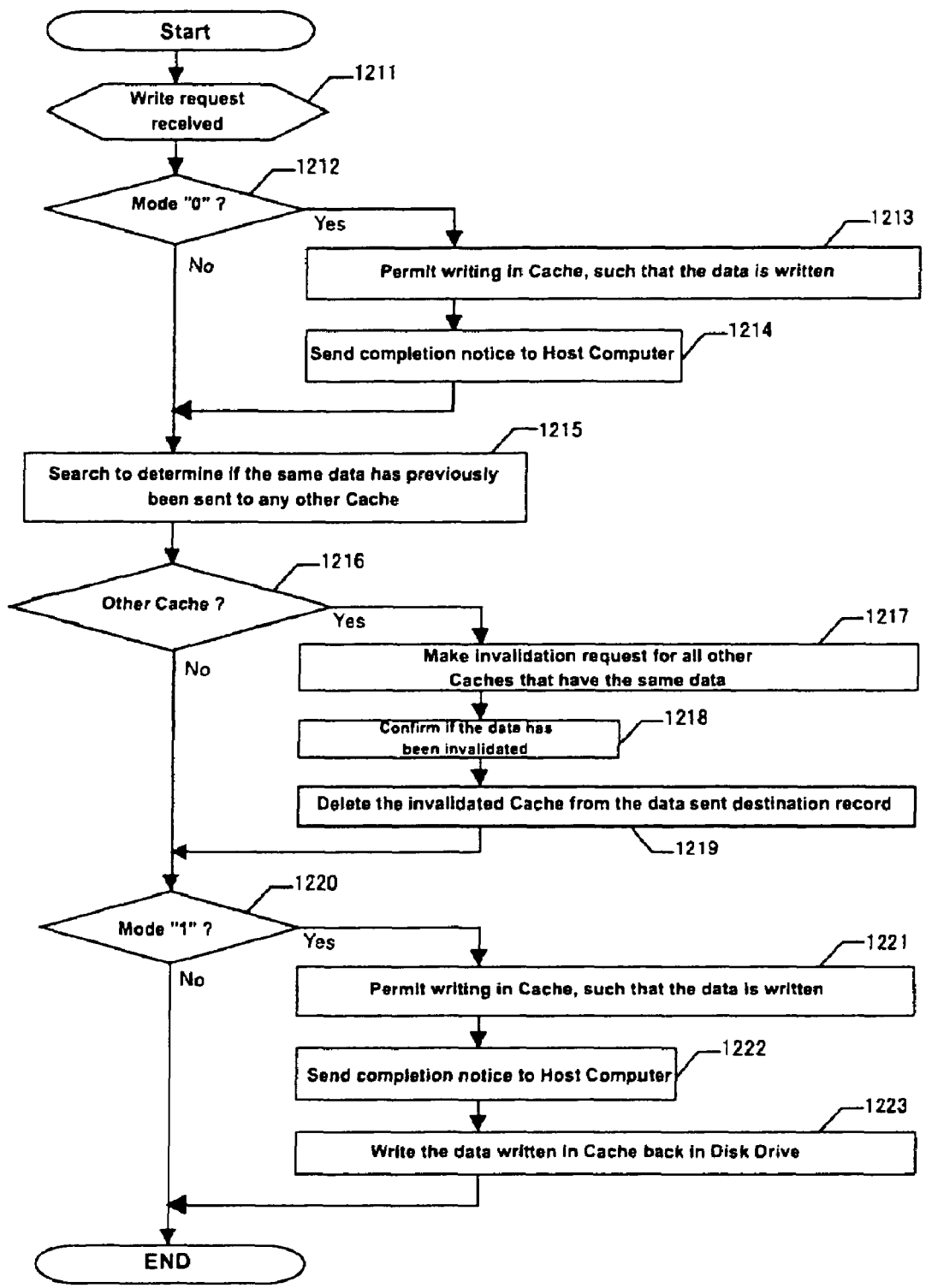
FIG. 12 is a flowchart illustrating a processing that takes place in a disk array device when a data write request is received in accordance with an embodiment example of the present invention.

A flowchart in FIG. 12 describes an embodiment example of a processing that takes place in a disk array device 1 when data that has been sent to one of the input/output channels 10a-10d is requested by other input/output channels 10a-10d to be sent and the appropriate disk adapter among the disk adapters 13a-13d sends to the first input/output channel among the input/output channels 10a-10d an invalidation signal to invalidate the data that is in one of the cache memories 11a-11d that corresponds to the first input/output channel among the input/output channels 10a-10d in order to maintain consistency of data in each of the cache memories 11a-11d, where the present processing controls the execution order of an consistency maintaining processing and a processing to notify completion to the host computer according to the mode of the content of the data input/output request.

Upon receiving a data write request from a host computer (step 1211), the input/output channel 10a checks the content of the mode column of the data write request (1212). If "0" is set in the mode column (step 1212: YES), the input/output channel 10a permits writing to the cache memory 11a corresponding to the input/output channel 10a and the data to be written is written in the cache memory 11a (step 1213); and the input/output channel 10a sends a write completion notice to the host computer (step 1214). On the other hand, if in step 1212, "1" is found to be set in the mode column (step 1212: NO), instead of writing the data in the cache memory 11a immediately, the input/output channel 10a proceeds to step 1215.

Next, the input/output channel 10a notifies the appropriate disk adapter among the disk adapters 13a-13d of the fact that the data write request has been made; the disk adapter upon being notified searches whether there are cache memories 11b-11d corresponding to any of the input/output channels 10b-10d that sent the data other than the input/output channel 10a that received the data write request (step 1215). If there are no other cache memories 11b-11d corresponding to any of the input/output channels 10b-10d that sent the data (step 1216: NO), the processing proceeds to step 1220. On the other hand, if there are cache memories 11b-11d corresponding to any of the input/output channels 10b-10d that sent the data, an invalidation request is sent to every applicable input/output channel among the input/output channels 10b-10d with their corresponding cache memories 11b-11d as the subject of the invalidation request (step 1217). For the invalidation request, the invalidation command shown in FIG. 8, for example, can be used.

Once it is confirmed that invalidation has taken place (step 1218), the input/output channel numbers of the cache memories among the cache memories 11b-11d that have been invalidated are deleted from record under the send destination input/output channel number (step 1219).

Next, in step 1220, the content of the mode column of the data write request is checked. If "1" is set in the mode column, the processing proceeds to step 1221, where writing data to the cache memory 11a corresponding to the input/output channel 10a that received the data write request is permitted and write data is received from the host computer and written to the cache memory 11a (step 1221), and a write completion notice is sent to the host computer (step 1222). The data written to the cache memory 11a is sent from the input/output channel 10a to the appropriate disk adapter among the disk adapters 13a-13d, and data is written back to the appropriate disk drive among the disk drives 14a-14d (step 1223).

On the other hand, if in step 1220, "0" is found to be set in the mode column, the processing proceeds to step 1223, since the processing that is equivalent to the processing in step 1221 has already taken place in step 1213.

As described above, when "0" is set in the mode column, the disk array device 1 according to the present embodiment example executes a processing for consistency maintenance after first sending the data read from one of the disk drives 14a-14d to the host computer. In other words, when "0" is set in the mode column of the data input/output request, the processing for consistency maintenance takes place after-the-fact, i.e., after a response processing from the disk array device 1 to the host computer has taken place, which enhances the response speed to the host computer.

As a result, if consistency does not have to be maintained due to the specification or nature of software operating on the host computer, or even if it does, it does not have to be strictly maintained, the response speed to the host computer can be enhanced for such a data input/output request by setting "0" in the mode column of the data input/output request from such software.

Figure 13:
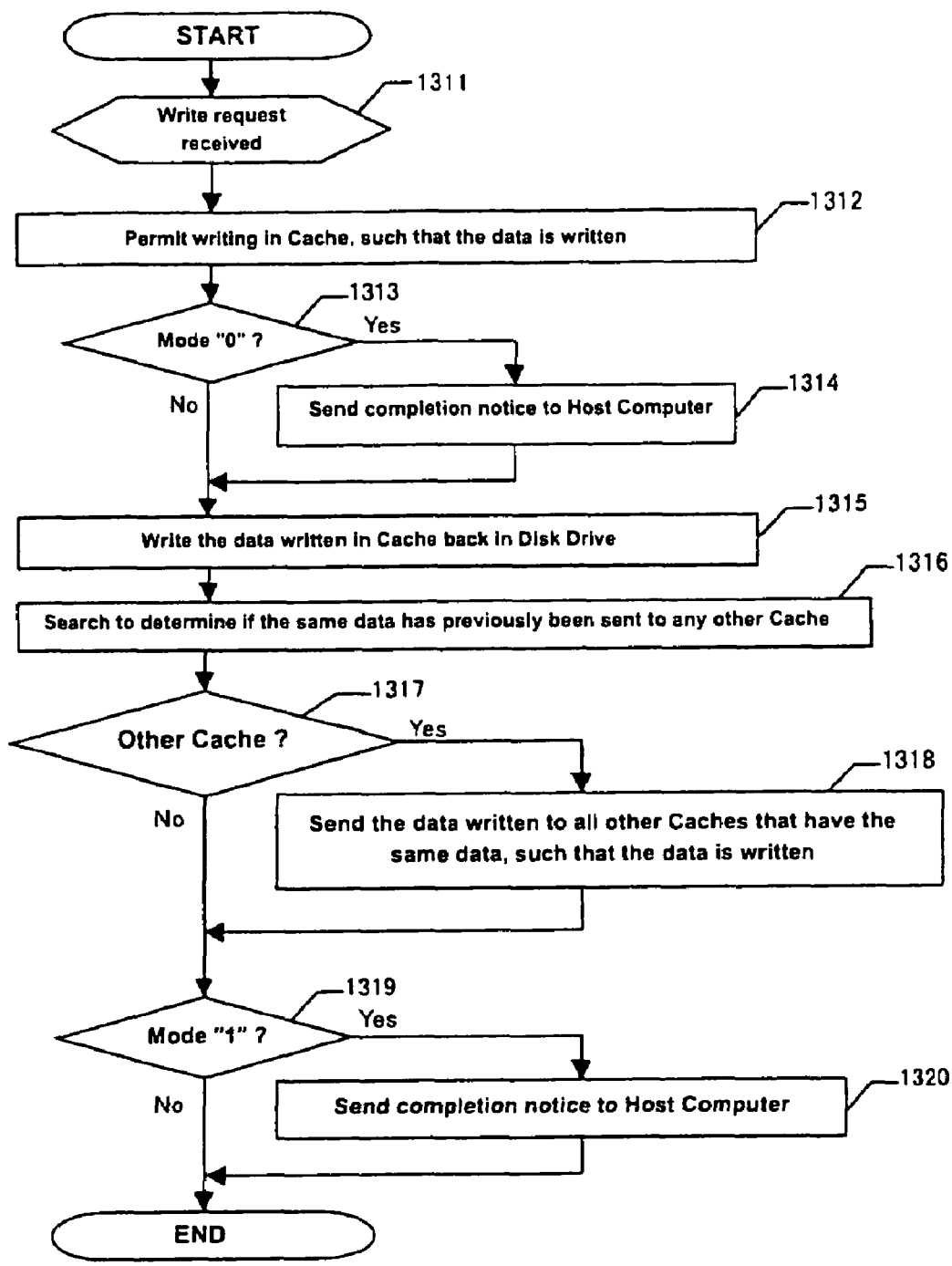
FIG. 13 is a flowchart illustrating a processing that takes place in a disk array device when a data write request is received in accordance with an embodiment example of the present invention.

A flowchart in FIG. 13 describes an embodiment example of a processing by the disk array device 1, which takes place when a data rewrite occurs in one of the cache memories 11a-11d that corresponds to one of the input/output channels 10a-10d and the rewritten data is written back to the appropriate disk drive among the disk drives 14a-14d through the appropriate disk adapter among the disk adapters 13a-13d, and at the same time the same pre-rewritten data in other cache memories 11a-11d that corresponds to other input/output channels 10a-10d is rewritten and updated, in order to maintain consistency of data in each of the cache memories 11a-11d, wherein the present processing controls the execution order of a consistency maintaining processing and a processing to notify completion to the host computer according to the mode of the content of the data input/output request.

Upon receiving a data write request from a host computer (step 1311), the input/output channel 10a permits writing of data to the cache memory 11a corresponding to the input/output channel 10a and writes the data to the cache memory 11a (step 1312).

Next, the content of the mode column of the data write request is checked (step 1313); if "0" is set in the mode column (step 1313: YES), the input/output channel 10a sends a write completion notice to the host computer (step 1314). On the other hand, if in step 1313 "1" is found to be set in the mode column (step 1313: NO), the processing proceeds to step 1315.

In step 1315, the write data is sent to the appropriate disk adapter among the disk adapters 13a-13d from the input/output channel 10a at appropriate timing, and the data written to the cache memory 11a is also written back to the original disk drive among the disk drives 14a-14d (step 1315).

Next, the appropriate disk adapter among the disk adapters 13a-13d checks whether there are cache memories 11b-11d that correspond to any of the input/output channels 10b-10d that sent the data previously, other than the input/output channel 10a in which data writing occurred (step 1316). If there are cache memories 11b-11d that correspond to any of the input/output channels 10b-10d that have sent the data previously (step 1317: YES), the processing proceeds to step 1318. If there are no such cache memories 11b-11d, the processing proceeds to step 1319.

In step 1318, the write data that has been written to the appropriate disk drive by the appropriate disk adapter is sent to every cache memory among the cache memories 11b-11d corresponding to any of the input/output channels 10b-10d that have the data, and the old data is overwritten by the new.

In 1319, the value in the mode column of the data write request is checked; if "1" is set in the mode column (step 1319: YES), a write completion notice is sent to the host computer (step 1320). On the other hand, if "0" is set in the mode column (step 1320: NO), the completion notice is not sent since it has already been sent in 1314.

As described above, according to the present embodiment example, when "0" is set in the mode column, the processing for consistency maintenance is executed after the data read from the disk drives 14a-14d is first sent to the host computer. In other words, if "0" is set in the mode column, the processing for consistency maintenance takes place after the response processing to the host computer from the disk array device 1, such that the response to the host computer takes place before the processing for consistency maintenance, which enhances the response speed to the host computer.

As a result, if consistency does not have to be maintained due to the specification or nature of software operating on the host computer, or even if it does, it does not have to be strictly maintained, the response speed to the host computer can be enhanced by setting "0" in the mode column of such a data input/output request from such software.

OTHER EMBODIMENTS

In the preceding embodiment examples, the execution order of a response processing to the host computer regarding a data input/output request and an consistency maintaining processing for data in each of the cache memories 11a-11d is controlled according to the value in the mode column of the data input/output request. However, the execution order of the two processing can be switched based on the value of LUN described in the data input/output request instead of the value in the mode column.

Specifically, in parts of the flowcharts in FIGS. 11 through 13 where the execution control takes place based on the value in the mode column, the value of LUN would be referred to instead of the value in the mode column and the processing would branch off based on the value of LUN. How the execution order can be controlled based on the value set in the mode column or the LUN value can, for example, be set by an operator operating a management terminal of the disk array device 1.

Some new disk array devices have a function to store, depending on the data input/output request, contents of data managed in its own logical volumes additionally on other disk array devices that are installed in remote location and connected to the disk array devices (where the function is sometimes called a "remote copying function") for the purpose of enhancing availability or disaster recovery performance.

As a method to realize such a function, other disk array devices can be communicatively connected to the input/output channels provided on the disk array device 1, and operation modes can be made switchable from a host computer through commands sent from the host computer to the disk array device 1 to switch between an operation mode in which the input/output channels write data to the disk array device's own disk drives (hereinafter called a "normal mode") and an operation mode in which the input/output channels send data input/output requests to the other disk array devices (hereinafter called a "copy mode").

If such a function is realized through such a method, the execution order of a processing to respond to a host computer for a data input/output request and a consistency maintaining processing for data in each cache memory can be controlled depending on which operation mode the input/output channel that received the data input/output request is operating in. In other words, for a data input/output request received by an input/output channel operating in the copy mode, for example, the priority is placed on the response to the host computer and the processing for consistency maintenance is performed later; on the other hand, for a data input/output request received by an input/output channel operating in the normal mode, the priority is placed on the processing for consistency maintenance and the response to the host computer takes place subsequently.

In other words, processing for data input/output requests received by input/output channels operating in the copy mode is deemed to often have less need for consistency maintenance compared to processing for data input/output requests received by input/output channels operating in the normal mode; consequently, the response speed to the host computer can be enhanced in the copy mode by applying the mechanism described.

This concludes the description of a disk array device according to the present invention, but the embodiments of the present invention serve only to facilitate the understanding of the present invention and do not limit the present invention. Many modifications can be made without departing from the present invention.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A disk array device comprising:
    a plurality of input/output channels that receive data input/output requests from at least one external device;
    a plurality of cache memories provided for the corresponding respective input/output channels, each of the cache memories connected to each of the corresponding respective input/output channels;
    a disk drive device;
    a disk control module that performs data input/output to and from the disk drive device;
    at least one communication module that communicatively connects the input/output channels with the disk control module; and
    a control module that controls, upon receiving a data input/output request from the at least one external device, a sequence of execution of a first operation of a response processing to respond to the at least one external device according to the data input/output request and a second operation of a consistency maintaining processing to maintain consistency of data stored in each of the cache memories such that one of said first and second operations is executed first and the other of said first and second operations is executed second,
    wherein an analysis of the data input/output request is performed to determine whether maintaining consistency of data stored in each cache memory is necessary and said control module controls the sequence of execution with a result that said first operation is executed first if maintaining consistency is not necessary.

2. A disk array device according to claim 1, further comprising:
    a consistency maintaining module that performs the consistency maintaining processing to maintain consistency of data stored in each of the cache memories.

3. A disk array device according to claim 2, wherein, when data stored in one of the cache memories is updated, the consistency maintaining module invalidates data stored in at least another one of the cache memories.

4. A disk array device according to claim 1, wherein, when data stored in one of the cache memories is updated, a consistency maintaining module updates data stored in at least another one of the cache memories.

5. A disk array device according to claim 1, wherein said control module controls the sequence of execution with a result that said first operation is executed first based on an information included in said input/output request that indicates the sequence of execution.

6. A method for controlling a disk array device, the disk array device comprising a plurality of input/output channels that receive data input/output requests from at least one external device, a plurality of cache memories provided for the corresponding respective input/output channels, each of the cache memories connected to each of the corresponding respective input/output channels, a disk drive device, a disk control module that performs data input/output to and from the disk drive device, and a communication module that communicatively connects the input/output channels with the disk control module, the controlling method comprising the steps of:
    receiving a data input/output request from the at least one external device; and
    controlling a sequence of execution of a first operation of a response processing to respond to the at least one external device according to the data input/output request and a second operation of the consistency maintaining processing such that one of said first and second operations is executed first and the other of said first and second operations is executed second,
    wherein an analysis of the data input/output request is performed to determine whether maintaining consistency of data stored in each cache memory is necessary and said control module controls the sequence of execution with a result that said first operation is executed first if maintaining consistency is not necessary.

7. A method according to claim 6, further comprising the step of:
    performing, by a consistency maintaining module, the consistency maintaining processing to maintain consistency of data stored in each of the cache memories.

8. A method according to claim 7, wherein, when data stored in one of the cache memories is updated, the consistency maintaining module invalidates data stored in at least another one of the cache memories.

9. A method according to claim 6, wherein, when data stored in one of the cache memories is updated, a consistency maintaining module updates data stored in at least another one of the cache memories.

10. A method according to claim 6, wherein said control module controls the sequence of execution with a result that said first operation is executed first based on an information included in said input/output request that indicates the sequence of execution.

* * * * *